United States Patent [19]

DiGiulio et al.

[11] Patent Number: 4,897,587

[45] Date of Patent: Jan. 30, 1990

[54] MICROPROCESSOR MOTOR CONTROLLER HAVING DISCRETE PROCESSING CYCLES

[75] Inventors: Peter C. DiGiulio, Bridgeport; Francis E. McDermott, Danbury; Edilberto I. Salazar, Brookfield; Mark W. Van Gorp, Danbury, all of Conn.; Ido Weisman, Rego Park, N.Y.

[73] Assignee: Pitney Bowes Inc., Stamford, Conn.

[21] Appl. No.: 281,354

[22] Filed: Dec. 8, 1988

[51] Int. Cl.[4] ............................................ G06F 15/20
[52] U.S. Cl. ................................ 318/625; 318/568.18; 364/471; 364/478; 270/58
[58] Field of Search .................. 318/15, 571, 561, 599, 318/602, 601, 603, 612, 625, 640, 685, 696; 364/471, 478, 519, 464.02, 464.03, 466; 270/1.1, 58; 209/3.31, 584, 546, 900; 271/305, 185, 251, 288, 303; 148/347, 444, 447, 460, 453, 524, 530, 463.6

[56] References Cited

U.S. PATENT DOCUMENTS

| 4,629,956 | 12/1986 | Nozawa et al. | 318/616 X |
| 4,698,777 | 10/1987 | Toyoda et al. | 318/568.18 |
| 4,796,196 | 1/1989 | Durst, Jr. et al. | 364/478 |
| 4,797,832 | 1/1989 | Axelrod et al. | 364/478 |
| 4,800,504 | 1/1989 | Durst, Jr. et al. | 364/478 |
| 4,800,506 | 1/1989 | Axelrod et al. | 270/58 X |
| 4,821,203 | 4/1989 | Carlton et al. | 364/471 X |

*Primary Examiner*—William M. Shoop, Jr.
*Assistant Examiner*—Paul Ip
*Attorney, Agent, or Firm*—Charles G. Parks, Jr.; David E. Pitchenik; Melvin J. Scolnick

[57] ABSTRACT

The motor controller system controls the respective motors of a plurality of cooperative apparatus associated with an article processing system, the article processing system for performing a plurality of functions upon an article traversing the article processing system and comprises a motor driver board having a plurality of input channels and a plurality of respective output channels. The motors are in line communication with a respective one of the output channels of the motor driver board. A programmable microprocessor is in bus communication with the driver board's input channels. A plurality of sensors are respectively mounted to each of the apparatus and in bus communication with the programmable microprocessor, the sensors being strategically located on the apparatus to provide such information to the microprocessor as article size, position and velocity information and to provide apparatus operation information. The microprocessor is programmed such that a cycle is preformed at a desired frequency, each control cycle being divided into discrete time intervals during which respective time interval the microprocessor transmits motor control command information to the driver board for respective motors and during other of the time intervals the microprocessor reads information from the sensors. The microprocessor is further programmed to perform additional processing during at least one of said time intervals.

20 Claims, 5 Drawing Sheets

FIG. 3
MMP MOTOR CONTROLLER SOFTWARE HIERARCHY

MICROPROCESSOR MOTOR CONTROLLER HAVING DISCRETE PROCESSING CYCLES

BACKGROUND OF THE INVENTION

This invention relates to microprocessor controllers and, more particularly, to such controllers as employed in the control of real-time machine operations such as in mail piece processing systems.

It is known to use microprocessor controller for the real-time control of certain machine operations. However, such controllers have not performed most suitably when employed as a over-all system controller for real-time machine operations in such machine environments where a plurality of machine subsystems function in a high speed synchronous and inter-dependent manner.

For example, a mail processing system may be comprised of a envelope feeder mechanism for receiving a stack of envelopes and, in a seriatim manner, serving up the envelope to a sealer-transport mechanism. The sealer-transport mechanism is charged with the function of sealing each envelope as it is caused to traverse a sealing apparatus and to serve-up the envelope to a mailing machine. It is known to also employ a scale mechanism interposed between the sealer-transport mechanism and the mailing machine. The scale mechanism is charged with the function of weighing the envelope by means of a scale, and determining the required postage value and communicating the postage value to a postage meter. In similar manner, a transport mechanism, customarily integral to the scale mechanism, must assume physical control over the envelope for positioning the envelope on the scale and thereafter serve-up the envelope to the mailing machine.

Generally, the mailing machine will include a transport mechanism which assumes control over the envelope and delivers the envelope to a printing station whereupon a postage meter will print an postage indicia on the envelope. The mailing machine transport mechanism will again assume control over the envelope and eject the envelope from the mailing machine.

As aforenoted, in the afore-described mail processing system, envelopes are processed in a seriatim manner. In such mail processing systems, it is known to provide each of the cited mechanisms with a motor or plurality of motors to act as prime movers for the associated mechanisms. As is known, each motor or group of motors is under the control of a microprocessor motor controller acting through respective driver boards. It is further known to provide a plurality of sensors associated with the respective mechanisms for providing input information to the respective motor controllers. The motor controllers are programmed to function independently of the other motor controllers. That is, there is a minimum of inter-controller communication generally restricted to "trip" and output speed information.

Synchronization can be achieved through the use of trip information and/or envelope speed information communicated between the several motor controllers. For example, the mailing machine transport motor controller upon receiving a trip signal and existing speed information from the proceeding process station, e.g., a scale, can initiate a count down to arrival of the envelope from the proceeding station. Further, the mailing machine transport motor controller can initiate transport speed adjustment to match the speed of the incoming envelope.

Such mail processing systems as afore-described have required the use of multiple microprocessor motor controllers, each of which controllers must be programmed. The programming of each controller is generally dependent on the hardware configuration of the mail processing system. Changes in the hardware configuration, such as, the addition of a scale, generally require program changes to the downstream controllers.

SUMMARY OF THE INVENTION

It is an object of the present invention to present a motor controller system architected such that a single motor controller can control the real-time operation of a plurality of motors. It is another objective of the present invention to present a means of managing motor controller loading facilitating to the use of a single motor controller to control a plurality of motors. It is a further object of the present invention to present a motor controller system whereby the motors under the influence of the motor controller are required to operate in a synchronous manner. It is a still further objective to present a motor controller system whereby the motors under the influence of the motor controller are subject to varying controlled velocity profiles. It is still a further objective of the present invention to present a motor controller system which in addition can perform other background control operations. It is yet another objective of the present invention to present a motor controller system which prioritizes the control of certain control and background functions.

The motor controller system is comprised of a microprocessor motor controller and a microprocessor sensor controller in direct parallel communication and is configured for particular suitability for employment in a mail processing system. A first and second board are in independent bus communication with the motor controller. Each driver board is in independent bus communication with a plurality of motors, some of which are servo motors. The respective motors or a group of motors are associated with a particular mail process system mechanism. Each system mechanism has associated therewith a plurality of sensors for supplying input to the motor controller through the sensor controller. Further, the servo motors have associated therewith either encoders for position servo or means to determine the back electro magnetic force of the motor for velocity servo. Each encoder is in bus communication with the motor controller.

The motor controller is also capable of performing background functions relating to other mail process system function. As a result, the motor controller is in bus communication with other mail process system micro-controllers.

The motor controller microprocessor is programmed to perform a control cycle during which a particular time period T is allotted to each motor control function. For example, motor servo information is received in a scheduled 40 microsecond (usec) interval. All motor control functions are performed every cycle. By programming the motor controller microprocessor, microprocessor loading can be appropriately managed to facilitate expanded system control.

Upon start-up of the motor controller system, the motor determines which motor driven mechanism are present. Should the controller determine that a particular motor driven mechanism is absent, the motor controller simple reallocates the corresponding processor time, for example, to a background function. Alternatively, the motor controller system can be instructed not to enable a desired motor driven mechanism. Again, the motor controller reallocates system processor time.

Other advantages and benefits of the present invention will be apparent to one skilled in the art upon a reading of the following detailed description.

DETAILED DESCRIPTION OF THE PREFERRED EMBODIMENT

The present invention addresses a system controller uniquely configured for application to high speed mail processing systems. Among other advantages, a principal advantage of the presented system controller is that it offers substantial flexibility in configuring a mail processing system. That is, the system controller enables the mail processing system to have an open architecture permitting the inclusion of additional processing stations as subsequently desired without revisiting the system controller or its programming. Alternatively, the motor controller can selectively enable subsystems of the mail processing system to create a matrix of mail processing system operating modes.

Figure 1:
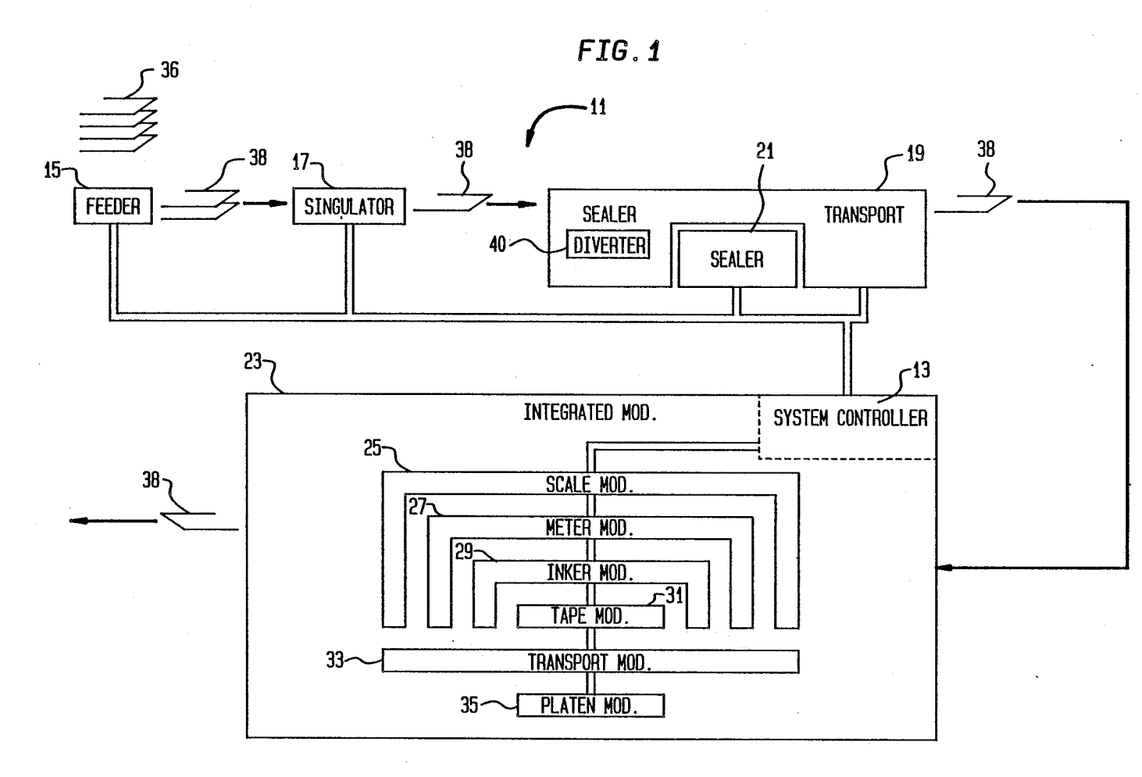
FIG. 1 is a schematic of a mail processing system particularly suited to the present invention.

Referring to FIG. 1, in the most preferred embodiment, the system controller operates on a mail processing system, generally indicated as 11, which is comprised of a plurality of modules under the control and influence of the system controller, generally indicated as 13. The individual modules are a envelope feeder module 15, a singular module 17, a sealer transport module 19 which includes a sealer module 21, and what is here referred to as an integrated module 23. The integrated module is comprised of a scale module 25, a meter module 27, an inker module 29, a tape module 31, a transport module 33 and a platen module 35. The integrated module is so referred to because the individual modules are mounted in a single housing, collectively hereafter referred to also as a mailing machine 23. Each module includes the appropriate mechanism to perform a mail processing function.

Generally, the feeder module 15 receives a envelope stack 36 and, in the preferred embodiment, includes suitable mechanisms to shingle the bottom portion of the mail stack 36. The singulator 17 is charged with the function of extracting a bottom most envelope 38 from the now partially shingled envelope stack 36 in a seriatim manner and delivering the envelope 38 to the sealer transport module 19. The sealer transport module 19 is charged with the function of traversing the envelope 38 across the sealer module 21. The sealer transport module 19 is a smart module having the capability of determining the sealing state of the envelope 38. The sealer transport module 19 includes a diverter module 40 for sensing and responding to the seal state of an envelope such that in an operative mode pre-sealed envelopes 38 can be distinguished from unsealed envelopes 38 such that only unsealed envelopes 38 are subject to sealing by the sealer module 21. The sealer transport module 19 also serves up the envelope 38 to the transport module 33 of the integrated module 23.

As aforenoted, the integrated module 23 is comprised of a scale module 25, a meter module 27, an inker module 29, a tape module 31, a transport module 33 and a platen module 35. The mailing machine transport module 33 receives the envelope 38 from the feeder transport 19 and delivers the envelope to the scale 25. The scale module 25 is charged with the function of weighing the envelope 38 and reporting the appropriate postage value as a function of the weight determined to the postage meter module 27 mounted to the mailing machine 23. The indicia printing method employed in the preferred mailing system is referred to in the art as flat bed indicia printing. In accordance therewith, as the envelope 38 rests upon the scale, subsequent to being weighed, the postage meter module 27 print elements are set to the appropriate value as a function of envelope 38 weight. The inker module 29 is then charged with the function of inking the indicia of the meter module 27. Subsequent to inking of the postage meter module print elements, the platen module 35 is charged with the function of bringing the envelope 38 into printing contact with the print elements of the postage meter module 27. After the envelope 38 has been imprinted by the postage meter module 27, the transport module 33 resumes control over the envelope 38 and ejects the envelope 38 from the mailing machine 23.

Figure 2:
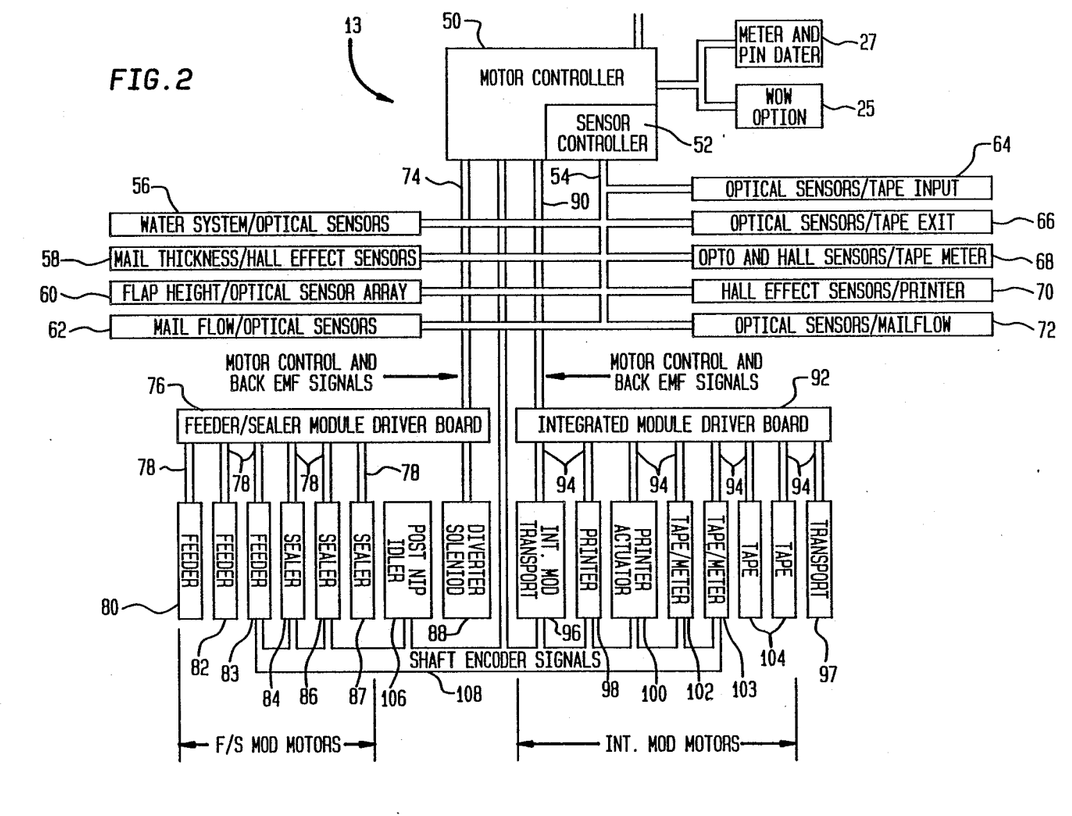
FIG. 2 is a schematic of a motor controller system configuration in accordance with the present invention.

Referring to FIG. 2, the controller system, generally indicated as 13, includes a programmable microprocessor motor controller 50 and a programmable microprocessor sensor controller 52. The motor controller 50 and sensor controller 52 are in direct parallel communication. Generally, the sensor controller 52 is programmed to poll each of a plurality of sensors and store the sensor information until called for by the motor controller 52.

A sensor bus 54 communicates the sensor controller 52 with a plurality of sensors and sensor banks. For example, the sensor controller 52 is in bus 54 communication with a plurality of sensors and sensor banks associated with the feeder section modules 15, 17 and 19, such as, optical sensors 56 associated with a water system for the sealer module 21, Hall effect sensors 58 associated with the singulator module 17 for determining the thickness of a envelope 38, an optical sensor array 60 for determining the flap configuration of an unsealed envelope 38 associated with the sealer module 21, mail flow optical sensors 62 associated with the respective feeder section modules 15, 17 and 19 for sensing the time-position of the envelope 38 relative to the respective feeder section modules 15, 17 and 19.

Further, the sensor controller 52 is in bus 54 communication with a plurality of sensors and sensor banks associated with the integrated module 23, such as, optical sensors 64 associated with the tape input to the tape module 31 and optical sensors 66 associated with the tape exit from the tape module 31, optical and Hall effect sensors 68 associated with the tape module 31 motor drive system and meter module 27 loading drive system, Hall effect sensors 70 associated with the platen module 35 drive system, and optical sensors 72 associated with the integrated module 35 for sensing the time-position of the envelope 38 within the integrated module 35.

It should be understood that suitable module assemblies acting under the motor influences is a matter of design choice. It should be further understood that the motor controller systems 13 will function cooperatively with any suitable mechanism system. The mechanism system here generally described is used for the purpose of illustration and sets forth the most preferred environment for the subject invention.

The motor controller 50 communicates through a first bus 74 with a first motor driver board 76. The driver board 76 may be located within the integrated module 23. Alternatively, the feeder section modules 15, 17 and 19 are mounted in a single housing also housing the driver board 76. The driver board 76 in turn is in respective bus 78 communication with a plurality of motors associated with a respective feeder section modules 15, 17 and 19, such as, motor 80 associated with the feeder module 15, motors 82 and 83 associated with the singulator module 17, motor 84 associated with the sealer transport module 19, motors 86 and 87 associated with the sealer module 21, and a solenoid motor 88 associated with the diverter module 40.

The motor controller 50 also communicates through a second bus 90 with a second motor driver board 92. The driver board 92, in turn, is in respective bus 94 communication with a plurality of motors associated with the modules 25, 27, 29, 31, 33 and 35 of the integrated module 23. For example, the driver board 92 through bus 94 communicated with motors 96 and 97 associated with the transport module 33, a motor 98 associated with the inker module 29, a motor 100 associated with the platen module 35, motors 102 and 103 associated with the tape/meter modules 29 and 31, and motor 104 associated with the tape module 29. It should be noted that a single driver board may be employed.

A plurality of the motors may include encoding apparatus enabling the respective motors to be under position servo-control of the motor controller 50, for example, motors 83, 84, 86, 96, 98, 100, 102, 103 and 106. An idler encoder mechanism 106 here associated with the sealer transport module 19 is included to provide true speed data for a traversing envelope 38 to the motor controller 50. The respective motor encoders are in bus 108 communication with the motor controller 50. The motor controller 50 can also communicate with ancillary and/or auxiliary system, such as, the meter module 27 and the scale module 25.

In the most preferred embodiment, the motor driver boards 76 and 96 are comprised of a plurality of channels. Each channel is associated with a respective motor and includes a conventional H-bridge amplifier responsive to a pulse width modulated signal generated by the motor controller 50. Any of the desired motors may be subject to position servo-control, in a manner to be described subsequently, and/or velocity servo-control. With respect to any motor chosen for velocity servo-control, the respective motor driver boards 76 or 92 channel further includes a conventional EMF (Electro Motive Force) circuit for deriving the back EMF of the respective motor and communicating the back EMF to the motor controller 50 through the respective bus 74 or 90 from which velocity information is obtained.

Figure 3:
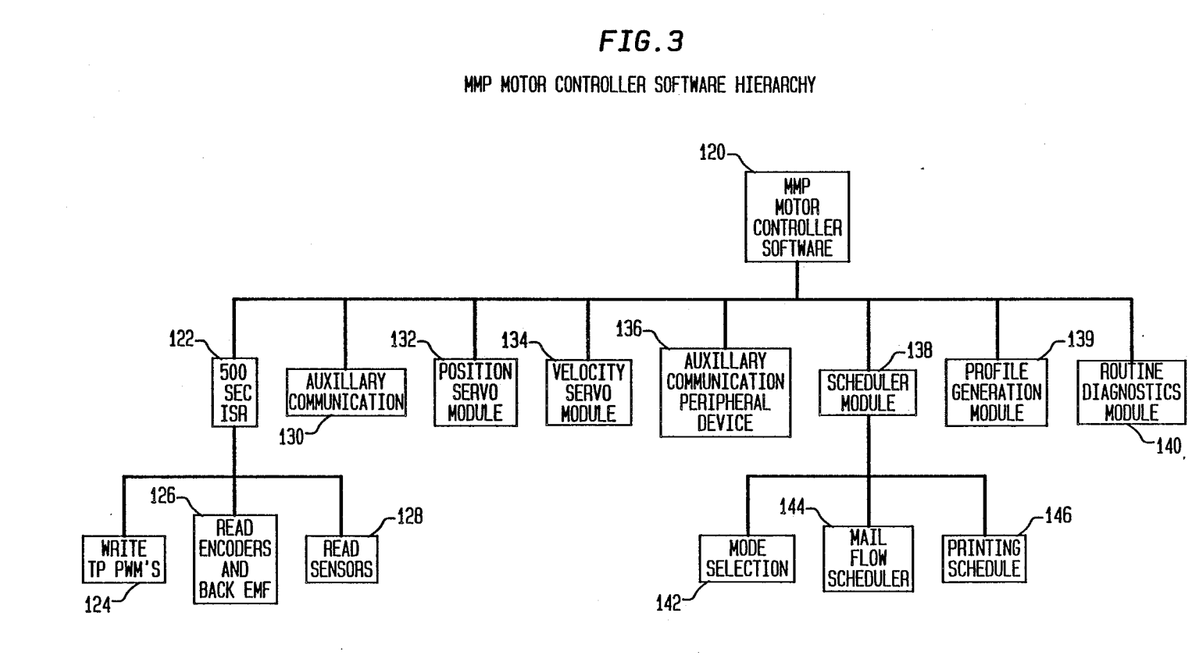
FIG. 3 is a motor controller software hierarchy diagram in accordance with the present invention.
Figure 4:
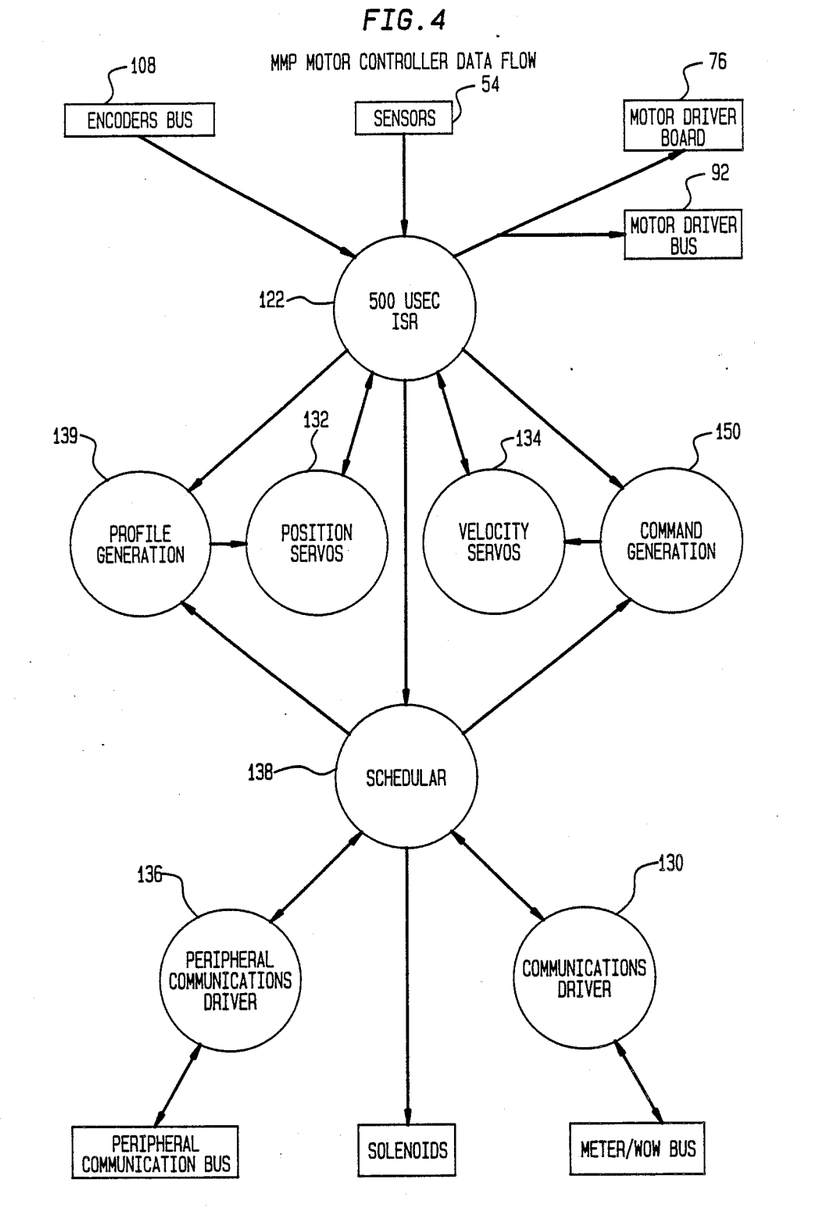
FIG. 4 is a motor controller data flow diagram in accordance with the present invention.

Referring more particularly to FIGS. 3 and 4, suitable motor controller 50 software interfaces, generally indicated as 120, is configured modularly. The software includes a 500 usec interrupt module 122 having submodules for generating motor PWM'S, module 124, reading encoders and back EMF's, module 126, and reading sensor data from the sensor controller 52, module 128. The software further includes a communications module 130, position servo-control module 132, velocity servo-control module 134, an ancillary communication module 136, a scheduler module 138, a velocity profile generating module 139 and a diagnostic module 140. The ancillary communication module 136 can drive communication between the motor controller 50 and peripheral devices.

The scheduler module 138 is comprised of three submodules; a mode selection module 142, a mail flow scheduler module 144 and a print scheduler module 146. The mode selection module 142 will control the operation modes of the motor controller, i.e., communications, mail flow and printer schedulers modules. The mail flow module 144 will schedule any events relating to mail flow and the print scheduler module will handle scheduling all events relating to postage printing on the envelope 18.

Referring to FIG. 4, the data flow is such that the interrupt module 122 receives data from the encoder bus 108 and sensor bus 54 and motor servo modules 132 and 134. The interrupt module 122 also transmits data to the motor driver boards 76 and 92, profile generations module 139, motor servo modules 132 and 134, and a subroutine 150 which generates servo commands. Subroutine 10 is a subroutine of module 134 and is intended to configure tracking motors such as motor 86. The scheduler module 138 receives data from the interrupt module 122 and the communication modules 130 and 136. The scheduler module 138 transmits data to the profile generation module 139, command generation module subroutine 150, communication modules 130 and 136, and to the system solenoids 88 and 96. The communication modules 130 and 136 transmit and receive from the appropriate communication bus.

Generally, the motor control system 13 is responsible for the activation and control of all motors and assemblies associated with the system modules. While mail processing includes the control of transport motors in the feeder, sealer, and integrated modules, mail processing may also include operator selectable functions. For example, in accordance with the mail processing system 11, the operation options are set forth in Table 1.

TABLE 1

| MAIL PROCESSING OPERATING MODE MATRIX | | | |
|---|---|---|---|
|  | PRINTING | SEALING | WEIGHING |
| FLOW ONLY | OFF | OFF | OFF |
| WEIGHT ONLY | OFF | OFF | ON |
| SEAL ONLY | OFF | ON | OFF |
| NO PRINT | OFF | ON | ON |
| PRINT ONLY | ON | OFF | OFF |
| NO SEAL | ON | OFF | ON |
| NO WEIGHT | ON | ON | OFF |
| FULL FUNCTION | ON | ON | ON |

Figure 5:
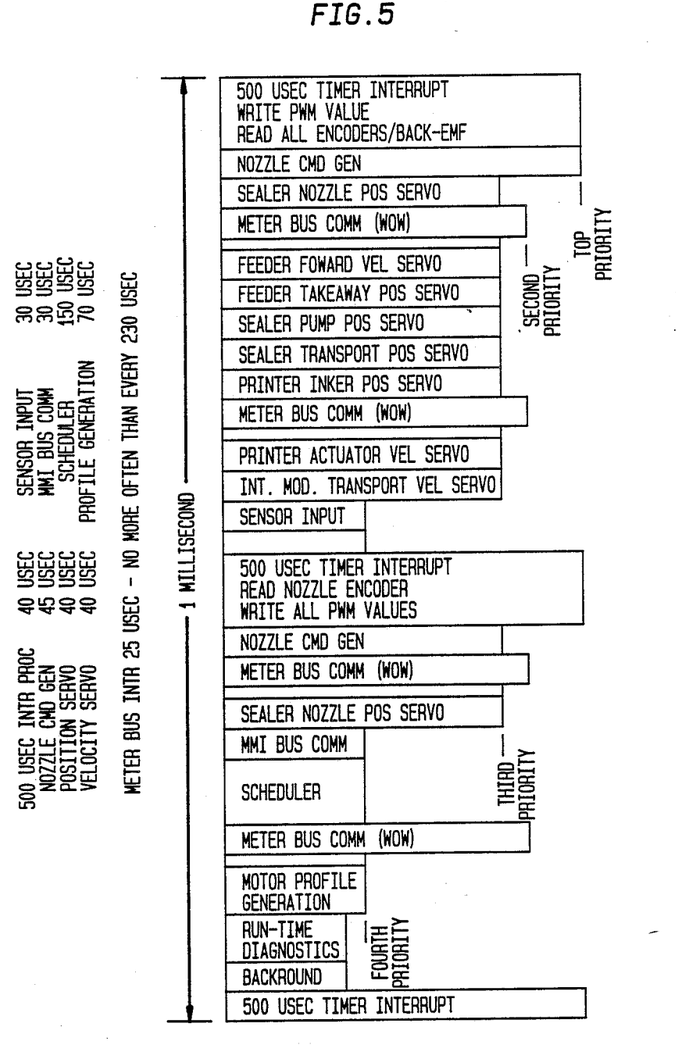
FIG. 5 is a schematic of the motor controller microprocessor loading in accordance with the present invention.

Referring to the motor controller 50 central processor unit (CPU) loading is managed by programming the motor control 50 to sequentially perform a control cycle every 1 millisecond as shown in FIG. 5. It is appreciated that the cycle time can be adjusted to suit system requirements. Each control cycle is divided into discrete time period T during which control functions are performed as noted in Table 2 illustrated in FIG. 5. The sequence of actions taken during each 1 millisecond control cycle, listed below, reads from right to left in FIG. 5:

TABLE 2

TIME CYCLE LOADING OF MOTOR CONTROLLER

| Time | Priority | Function |
|---|---|---|
| T1 | 1 | 500 usec Timer Interrupt/ Read all encoders/ Write motor configurations |
| T2 | 1 | Generate command routine for motor 86 |
| T3 | 3 | Execute position servo control routine for motor 86 |
| T4 | 2 | Enter communication mode with ancillary micro systems |
| T5 | 3 | Execute velocity servo control routine for motors 82 |
| T6 | 3 | Execute position servo control routine for motors 83 |
| T7 | 3 | Execute velocity servo control routine for 87 |
| T8 | 3 | Execute position servo control routine for motor 84 |
| T9 | 3 | Execute position servo control routine for motor 98 |
| T10 | 2 | Enter communication mode with ancillary micro-systems |
| T11 | 3 | Execute velocity servo control routine for motor 100 |
| T12 | 3 | Execute velocity servo control routine for motor 96 |
| T13 | 4 | Read all sensor inputs |
| T14 | 1 | 500 usec Timer Interrupt/ Read all encoders/ Write motor configurations |
| T15 | 3 | Generate command routine for motor 86 |
| T16 | 2 | Enter communication mode with ancillary micro systems |
| T17 | 3 | Execute position servo-control routine for motor 86 |
| T18 | 4 | Reserved for auxiliary micro-system bus communication routine |
| T19 | 4 | Enter Scheduler routine |
| T20 | 2 | Enter communication mode with ancillary micro systems |
| T21 | 4 | Execute motor profile generation routine |
| T22 | 5 | Execute Run-Diagnostic routine |
| T23 | 5 | Run background operation |

During each control period, the specified control function is performed and is prioritized. The routines range from priority 1 to 5, priority 1 being the highest priority. As the procedure in accordance with Table 2, if at any point a higher priority function requires additional processor time, the required time is appropriated from the lowest remaining priority function. For example, time may be appropriated from time interval 22 such that Run-Diagnostic are not performed in the particular cycle.

It can now be appreciated by one skilled in the art, that the present invention as here-described offers a most suitable system controller for application to high speed mail processing systems and allows for substantial flexibility in configuring of a mail processing system. It is understood that the afore-described detailed description represents the preferred embodiment of the invention in the most preferred system environment and that the motor control system here-described may be varied to most suitably accommodate the application environment. As a result, the here-described preferred embodiment of the present invention should not be taken as limiting. The full scope of the present invention is claimed in the appendix claims.

Reference is made to a concurrently filed application, serial No. 281,355, which claims other aspects of the system described herein.

What is claimed is:

1. A motor controller system for controlling the respective motors of a plurality of cooperative apparatus associated with an article processing system, said article processing system for performing a plurality of functions upon an article traversing said article processing system, comprising:
    a motor driver board having a plurality of input channels and a plurality of respective output channels;
    said motors being in line communication with a respective one of said output channels of said motor driver board;
    a programmable microprocessor in bus communication with said driver board's input channels;
    a plurality of sensors respectively mounted to each of said apparatus and in bus communication with said programmable microprocessor, said sensors being strategically located on said apparatus to provide such information to said microprocessor as article size, position and velocity information and to provide apparatus operation information;
    said microprocessor being programmed such that a control cycle is performed at a desired frequency, each control cycle being divided into discrete time intervals during which respective time interval said microprocessor transmits motor control command information to said driver board for respective motors and during other of said time intervals said microprocessor reads information from said sensors;
    said microprocessor being further programmed to include schedule program means for scheduling the actuation of said motors relative to the respective motor control cycle for synchronous and cooperative operation of said motors during another one of said time intervals,
    said microprocessor being further programmed to perform additional processing during at least one of said time intervals.

2. A motor controller system as claimed in claim 1 further comprising motor velocity program means for generating a velocity profile for each of said respective motors during another one of said time intervals.

3. A motor controller system as claimed in claim 2 further comprising:
    said driver board having means associated with desired ones of said driver board channels for determining the EMF of a respective motor, said means being in informing bus communication with said microprocessor;
    encoder means responsive to the position of plurality of said respective ones of said motors for informing said microprocessor of said respective motor position, said encoder means being in bus communication with said microprocessor; and,
    said microprocessor being further programmed to further include a plurality of cycle time intervals to process said EMF information of respective ones of said motors and said encoder information of respective ones of said motors and send new motor servo command for said respective motor during said next motor command transmission interval.

4. A motor controller as claimed in claim 1 further comprising a sensor controller in bus communication with said programmable microprocessor for collecting and storing information from said sensor in sensor bus communication with said sensor controller such that during at least one of said time intervals upon request of said motor controller said sensor controller transmits said stored sensor information to said programmable microprocessor.

5. A motor controller as claimed in claim 4 further comprising program means for assigning a priority to each of said time intervals such that should a higher priority time interval function require additional processor time per cycle, said additional processor time is granted from the processor time interval assigned to the lowest priority remaining time interval.

6. A motor controller as claimed in claim 1 further comprising:
said microprocessor having ancillary communication means for generating and receiving data messages from additional ones of additional message sources during at least one of said time intervals.

7. A motor controller system for controlling the respective motors of a plurality of cooperative apparatus associated with a mailpiece processing system, said mailpiece processing system for performing a plurality of functions upon a mailpiece traversing said mailpiece processing system, comprising:
a motor driver board having a plurality of input channels and a plurality of respective output channels;
said motors being in line communication with a respective one of said output channels of said motor driver board;
a programmable microprocessor in bus communication with said driver board's input channels;
a plurality of sensors respectively mounted to each of said apparatus and in bus communication with said programmable microprocessor, said sensors being located on said apparatus to provide such information to said microprocessor as mailpiece size, position and velocity information and to provide apparatus operation information;
said microprocessor being programmed such that a control cycle is performed at a desired frequency, each control cycle being divided into discrete time intervals during which respective time interval said microprocessor transmits motor control command information to said driver board for respective motors and during other of said time intervals said microprocessor reads information from said sensors; and,
and microprocessor being further programmed to include schedule program means for scheduling the actuation of said motors relative to the respective motor control cycle for synchronous and cooperative operation of said motors during another one of said time intervals,
said microprocessor being further programmed to perform additional processing during at least one of said time intervals.

8. A motor controller system as claimed in claim 7 further comprising motor velocity program means for generating a velocity profile for each of said respective motor during another one of said time intervals.

9. A motor controller system as claimed in claim 8 further comprising:
said driver board having means associated with desired ones of said driver board channels for determining the EMF of a respective motor, said means being in informing bus communication with said microprocessor;
encoder means responsive to the position of a plurality of said respective ones of said motors for informing said microprocessor of said respective motor position, said encoder means being in bus communication with said microprocessor; and,
said microprocessor being further programmed to further include a plurality of cycle time intervals to process said EMF information of respective ones of said motors and said encoder information of respective ones of said motors and send new motor servo command for said respective motors during said next motor command transmission internal.

10. A motor controller as claimed in claim 9 further comprising a sensor controller in bus communication with said programmable microprocessor for collecting and storing information from said sensor in sensor bus communication with said sensor controller such that during at least one of said time intervals upon request of said motor controller said sensor controller transmits said stored sensor information to said programmable microprocessor.

11. A motor controller as claimed in claim 10 further comprising program means for assigning a priority to each of said time intervals such that should a higher priority time interval function require additional processor time per cycle said additional processor time is granted from the processor time interval assigned to the lowest priority remaining time interval.

12. A motor controller as claimed in claim 11 further comprising:
said microprocessor having ancillary communication means for generating and receiving data messages from additional ones of additional message sources during at least one of said time intervals.

13. A high-speed mail processing system comprising:
(a) apparatus for processing mail pieces in a seriatim manner, said apparatus including at least a plurality of active means selected from among the following means:
feeder means, singulator means, sealer means, scale means, printing means, postage accounting means, and transport means;
(b) each of said active processing apparatus means having motor means for actuating same and sensing means for detecting mailpiece events as mailpieces are processed by said means and generating sense signals;
(c) a controller for controlling operation of said processing apparatus, said controller having programmable microprocessor means and being connected by way of communication lines to each of said processing apparatus means active in said apparatus, said controller being programmed to execute repeatedly a control cycle of operations in which, during each cycle, the controller communicates with each of the active processing apparatus means to determine its status by receiving its sense signals and to issue commands to the motor means of the active processing apparatus means in response to said received sense signals in accordance with a program controlling the microprocessor means;
(d) said controller being further programmed to schedule certain functions during earlier time intervals of the control cycle and to schedule other functions during later time intervals of the same control cycle.

14. The system of claim 13, wherein the various functions to be performed by the microprocessor means are assigned priorities of higher and lower values, and the microprocessor means is programmed to perform more of the higher priority functions during said earlier time intervals and more of the lower priority functions during said later time intervals.

15. The system of claim 14, wherein said microprocessor means is programmed to prolong the time interval for performing a higher priority function by appropriating time from a time interval allocated to a lower priority function.

16. The system of claim 14, wherein at least one of said later time intervals is allocated for performing background processing as a lower priority function.

17. The system of claim 14, wherein at least one of said later time intervals is not allocated but is free for performing functions on processing means subsequently added to the system.

18. A motor controller system for controlling the respective motors of a plurality of cooperative apparatus associated with an article processing system, said article processing system for performing a plurality of functions upon an article traversing said article processing system, said apparatus having a plurality of sensors respectively mounted to each of said apparatus and being located on said apparatus to provide information concerning articles and to provide apparatus operation information, comprising:

(a) motor driver means having input and output channels, said motors being in communication with an output channel of said motor driver means;
(b) programmable microprocessor means in communication with said motor driver means's input channels and with said sensors; and
(c) said microprocessor means being programmed:
   (i) to perform a control cycle at a desired frequency, each control cycle being divided into discrete time intervals,
   (ii) during corresponding time intervals of each cycle, to transmit motor control command information to said driver means for respective motors,
   (iii) during corresponding others of said time intervals, to read information from said sensors,
   (iv) to schedule the actuation of said motors during a subsequent control cycle in response to sensor information read during a previous control cycle.

19. A motor controller system as claimed in claim 18, wherein said motors are controlled solely by information transmitted to it along the output channel from the driver means.

20. The system of claim 18, wherein actions taken during certain time intervals are assigned different priorities.

* * * * *